Aug. 11, 1925.
A. BIENER
ANIMAL TRAP
Filed March 24, 1925
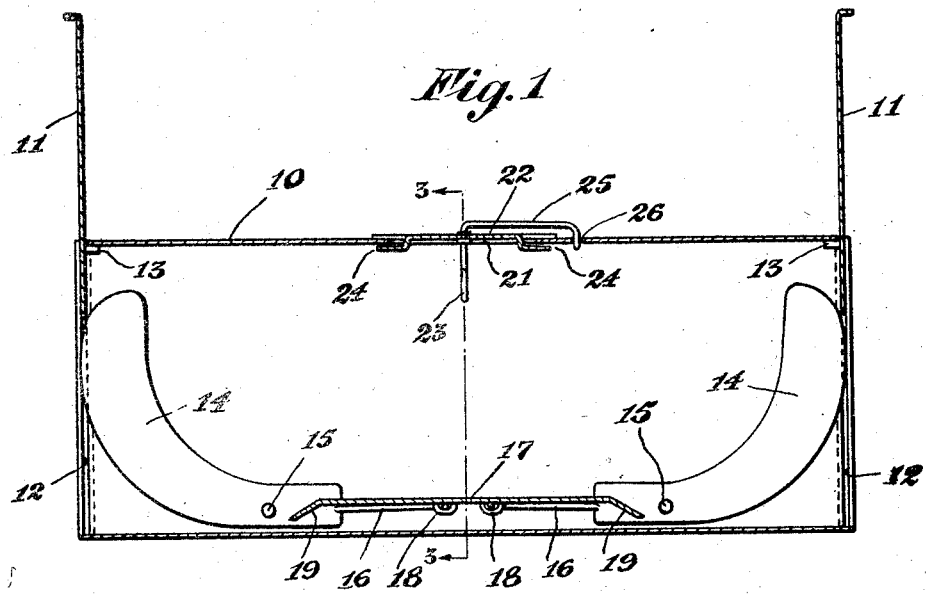
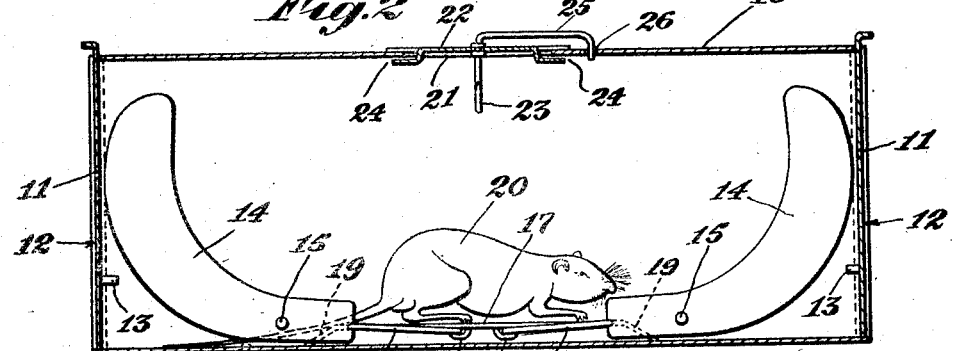
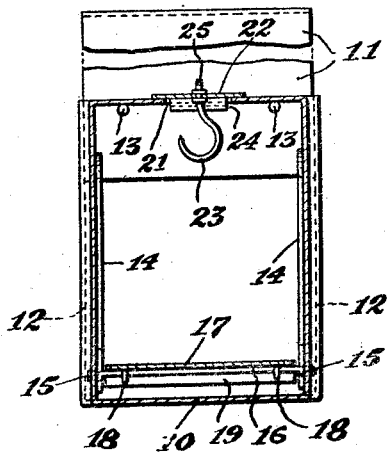
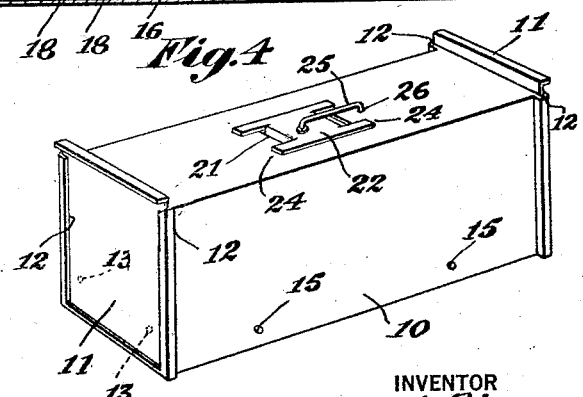
INVENTOR
August Biener.
BY
James E. Sproll.
ATTORNEY Patented Aug. 11, 1925.

1,549,730

UNITED STATES PATENT OFFICE.

AUGUST BIENER, OF SEATTLE, WASHINGTON, ASSIGNOR OF ONE-HALF TO JACOB SCHROEDER, OF SEATTLE, WASHINGTON.

ANIMAL TRAP.

Application filed March 24, 1925. Serial No. 17,384.

*To all whom it may concern:*

Be it known that I, AUGUST BIENER, a citizen of the United States, residing at Seattle, in the county of King and State of Washington, have invented certain new and useful Improvements in Animal Traps, of which the following is a specification.

My invention relates to improvements in animal traps, having more particular reference to the type of trap designed for the capture or ensnarement of rodents, and aims primarily to provide a novel construction which is simple, durable, efficient and reliable in use and capable of being manufactured at a comparatively low cost.

With these ends in view the invention consists in the provision of an animal trap, which when open and set forms a clear and unobstructed runway for the rodent, to thereby allay the suspicions of the most wary rodents, but, which is extremely sensitive to actuation by even the smallest rodent, and upon the entrance of the same is actuated, thereby ensnaring and entrapping the rodent without injury and without alarming other rodents which may be in the vicinity.

The invention further resides in the novel structural features, combination, adaptation and arrangement of parts, as will hereinafter be described and succinctly defined in the appended claims.

Referring now to the drawings wherein is illustrated the specific form of the invention, as at present preferred:—

Figure 1 is a view in medial longitudinal section of an animal trap fabricated in accordance with my invention, the same being illustrated in an open and set position.

Fig. 2 is a similar view with the trap in a closed position.

Fig. 3 is a view in vertical transverse section taken on line 3—3 of Fig. 1, and Fig. 4 is an exterior view in perspective of my trap in a closed postion.

In the drawings like reference numerals designate like parts throughout the several views.

The reference numeral 10 designates a rectangular casing provided with open ends adapted to be closed by gravity doors 11 slidably mounted in grooves 12 formed upon the side walls of the casing 10 contiguous to the ends thereof.

To limit the outward movement or travel of the doors 11 within the grooves 12 and to prevent the removal of the doors therefrom I have provided said doors upon the inner sides and adjacent the lower ends thereof with inwardly directed stop pins 13 adapted to abut the underside of the top wall of the casing 10, when the doors 11 are elevated, as shown in Fig. 1.

When the trap is open and set, each door 11 is retained in an elevated position by a pair of cam members 14 restrainingly engaging the lower edge of said door at points thereon contiguous to the grooves 12. The cam members 14 are pivotally secured, as at 15, to the inner faces of the side walls of the casing 10 adjacent the ends and lower portions thereof. Each pair of cam members 14 are interconnected at the inner ends by inwardly extending yoke members 16 transversely disposed in a horizontal plane within the casing 10.

The side portions of the yoke members 16 are integrally connected at the outer ends thereof to the inner ends of the cam members 14 and extend inwardly therefrom along the side walls of the casing 10 to points substantially midway of the length of said casing.

Longitudinally disposed in a horizontal plane within the casing 10 and superimposed in symmetrical relation upon the transverse portions of the yoke members 16 is a reciprocable trap actuating platform 17 provided upon the underside substantially midway of the length and adjacent the sides thereof with pairs of eyes or loops 18 rigidly secured thereto in spaced relation, through which the aforesaid transverse portions are adapted to extend, to thereby hingedly connect said portions with the platform 17 for reciprocation therewith.

The platform 17 is bent downwardly and outwardly at the ends thereof to form sloping portions 19, which provide easy approaches to the said platform for the most wary and suspicious rodents, while also functioning as stops adapted to abut the lower wall of the casing 10 to limit the downward movement of the platform when the same is depressed by the weight of the animal or rodent 20, as shown in Fig. 2.

The sloping ends 19 of the platform 17 are interposed between the inner ends of the cam members 14 whereby horizontal movement or dislodgement of the platform in a lateral direction is prevented, while, the method of securing the platform 17 to the yoke members 16 will effectively prevent horizontal movement or dislodgement of said platform in a longitudinal direction, as will be manifestly apparent by referring to the several views in the drawings.

Medially formed in the top wall of the casing 10 is a rectangular opening 21 adapted to be normally closed by a removable door or closure 22 having a bait hook 23 medially and rigidly secured thereto upon the underside thereof. The door 22 is formed by longitudinally slitting the ends of a rectangular plate of the desired size adjacent the sides thereof and bending the central portions, so formed, downwardly beneath the plane of the plate and the remaining terminal side portions, to thereby provide clips 24 therefor adapted to engage the end edge portions of the rectangular opening 21, as shown, whereby the door 22 is removably secured at the ends thereof to the casing 10.

The door 22 having the bait hook 23 attached thereto may be readily and independently removed for the baiting or rebaiting of the trap without disturbing the actuating mechanism of the latter, while the same is set, and said door, when positioned, is adapted to be normally locked to the top wall of the casing 10 to prevent dislodgement therefrom, as by a resilient lock member 25 having the inner end thereof medially and rigidly secured to the upper side of the door 22, while, the outer or free, downwardly bent end of said member is adapted to be restrainingly engaged within an aperture 26 formed in the said top wall of the casing 10, as shown in Figs. 1, 2 and 4.

A trap of the type disclosed is substantially open throughout when set and offers practically no obstruction to the entrance of the rodent, a feature which is most desirable in a trap of this type and when dealing with certain types of rodents which are wary regarding entering constricted spaces, but, which do not hesitate and are not at all suspicious when a clear and unobstructed runway is presented.

The trap is opened and set by inverting the same whereupon the doors 11 drop by gravity and the cam members 14 due to their own weight and the weight of the associated trap actuating platform 17 are caused to moved outwardly to engage the lower edges of the said doors, whereupon the trap is reinverted and disposed in the location invested by the rodents. As the rodent traverses the casing 10 it steps upon the trap actuating platform 17 depressing the same, thereby instantaneously and simultaneously releasing the cam members 14 from frictional engagement with the lower edges of the doors 11 whereupon the latter drop by gravity, thus entrapping the rodent. The rodent is disposed of in any desired manner, such as by submerging the trap in water to drown said rodent, after which the trap is reset by inverting the same, as hereinbefore described.

While I have herein shown and described my invention with sufficient detail to enable those skilled in the art to which it pertains to understand the mode of construction and the principles involved, it is to be understood that there is no intentional limitation to the specific form and precise details of construction of the invention, as herein shown and described, except as expressly defined by the appended claims, and that various modifications of said construction may be resorted to without departing from the invention or the benefits derivable therefrom.

Having thus fully described my invention, what I claim as new and desire to secure by Letters Patent of the United States is:—

1. In an animal trap, in combination, a casing having openings leading thereinto, gravity doors for closing said openings, cam members pivotally mounted upon the walls of said casing adapted to restrainingly engage said doors to maintain the latter in an elevated open position, and a trap actuating platform connected to said cam members adapted to be actuated by the animal to be trapped whereby said cam members are disengaged from said doors to permit the latter to close by gravity.

2. In an animal trap, in combination, a casing having openings leading thereinto, gravity doors for closing said openings, stop means carried by said doors adapted to limit the outward movement thereof, cam members pivotally mounted upon the walls of said casing adapted to restrainingly engage said doors to maintain the latter in an elevated open position, and a reciprocable trap actuating platform connected to said cam members adapted to be actuated by the animal to be trapped whereby said cam members are disengaged from said doors to permit the latter to close by gravity.

3. In an animal trap, in combination, a casing provided with open ends and having grooves formed within the side walls thereof contiguous to the said open ends, gravity doors slidably disposed within said grooves for closing said open ends, cam members pivotally mounted upon the walls of said casing adapted to restrainingly engage said doors to maintain the latter in an elevated open position, and a longitudinally disposed actuating platform connected to said cam members adapted to be actuated by the animal to be trapped whereby said cam members are disengaged from said doors to permit the latter to close by gravity.

4. In an animal trap, in combination, a casing provided with open ends and having grooves formed within the side walls thereof contiguous to the said open ends, gravity doors slidably mounted within said grooves for closing said open ends, stop means carried by said doors adapted to limit the outward movement thereof, cam members pivotally mounted upon the walls of said casing adapted at the outer ends thereof to engage the lower edges of said doors to maintain the latter in an elevated open position and at the inner ends thereof to extend inwardly to points substantially midway the length of said casing, and a longitudinally disposed trap actuating platform connected to and interposed between the inner ends of said cam members adapted to be actuated by the animal to be trapped whereby said cam members are disengaged from said doors to permit the latter to close by gravity.

5. In an animal trap, in combination, a rectangular casing provided with open ends and an opening in the top wall thereof, grooved extensions formed upon the open ends of said casing, gravity doors slidably mounted within said grooved extensions for closing said open ends, stop pins carried upon the inner faces of said doors adapted to abut the underside of the top wall of said casing to limit the outward movement of said doors, opposing pairs of cam members pivotally mounted upon the inner faces of the side walls of said casing adjacent the ends and lower portions thereof adapted at the outer ends to restrainingly engage the lower edges of said gravity doors to retain the latter in an elevated open position, yoke members adapted to interconnect each pair of opposing cam members at the inner ends thereof, a longitudinal and horizontally disposed reciprocable trap actuating platform adapted to be interposed between said cam members and superimposed upon said yoke members to be actuated by the animal to be trapped whereby said cam members are disengaged from said doors to permit the latter to close by gravity, a removable door adapted to close the opening in the top wall of said casing, a bait hook secured to the inner side of said removable door, and a resilient lock member to retain said door in a closed position.

In testimony whereof I affix my signature.

AUGUST BIENER.